US010324406B2

(12) United States Patent
Endoh et al.

(10) Patent No.: US 10,324,406 B2
(45) Date of Patent: Jun. 18, 2019

(54) APPARATUS AND SYSTEM FOR FORMING IMAGE

(71) Applicant: CANON KABUSHIKI KAISHA, Tokyo (JP)

(72) Inventors: Keisuke Endoh, Fuji (JP); Hideyuki Matsubara, Mishima (JP); Takeshi Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/551,832

(22) PCT Filed: Jan. 21, 2016

(86) PCT No.: PCT/JP2016/000310
§ 371 (c)(1), (2) Date: Aug. 17, 2017

(87) PCT Pub. No.: WO2016/132674
PCT Pub. Date: Aug. 25, 2016

(65) Prior Publication Data

US 2018/0039213 A1 Feb. 8, 2018

(30) Foreign Application Priority Data

Feb. 20, 2015 (JP) ................................ 2015-032064

(51) Int. Cl.
*G06F 15/00* (2006.01)
*G03G 15/00* (2006.01)
*G03G 15/23* (2006.01)

(52) U.S. Cl.
CPC ....... *G03G 15/5062* (2013.01); *G03G 15/553* (2013.01); *G03G 15/556* (2013.01); *G03G 15/234* (2013.01)

(58) Field of Classification Search
CPC . G03G 15/5062; G03G 15/553; G03G 15/556
USPC ........................................................ 358/1.9
See application file for complete search history.

(56) References Cited

U.S. PATENT DOCUMENTS 8,886,060 B2 * 11/2014 Kakigi ............... G03G 15/0189 399/26

FOREIGN PATENT DOCUMENTS

| | | | |
|---|---|---|---|
| JP | 5-6092 | A | 1/1993 |
| JP | 7-140776 | A | 6/1995 |
| JP | 7-334042 | A | 12/1995 |
| JP | 2001-285555 | A | 10/2001 |

(Continued)

OTHER PUBLICATIONS

Machine translation of Japanese Patent Document No. 07-334042, Shindou, Dec. 22, 1995 (Year: 1995).*

*Primary Examiner* — Mark R Milia
(74) *Attorney, Agent, or Firm* — Canon USA Inc., IP Division

(57) ABSTRACT

An image forming apparatus includes a member for use in forming an image, an acquiring unit, a scanning unit, and a control unit. The acquiring unit is configured to acquire first image information on the image formed on a recording material. The scanning unit is configured to scan the image formed on the recording material to acquire second image information. The control unit is configured to compare the first image information acquired by the acquiring unit with the second image information acquired by the scanning unit to determine a state of the member based on a comparison result.

9 Claims, 13 Drawing Sheets

(56) References Cited

FOREIGN PATENT DOCUMENTS

| | | | |
|---|---|---|---|
| JP | 2001-318566 | A | 11/2001 |
| JP | 2013-171197 | A | 9/2013 |

* cited by examiner

[Fig. 1]
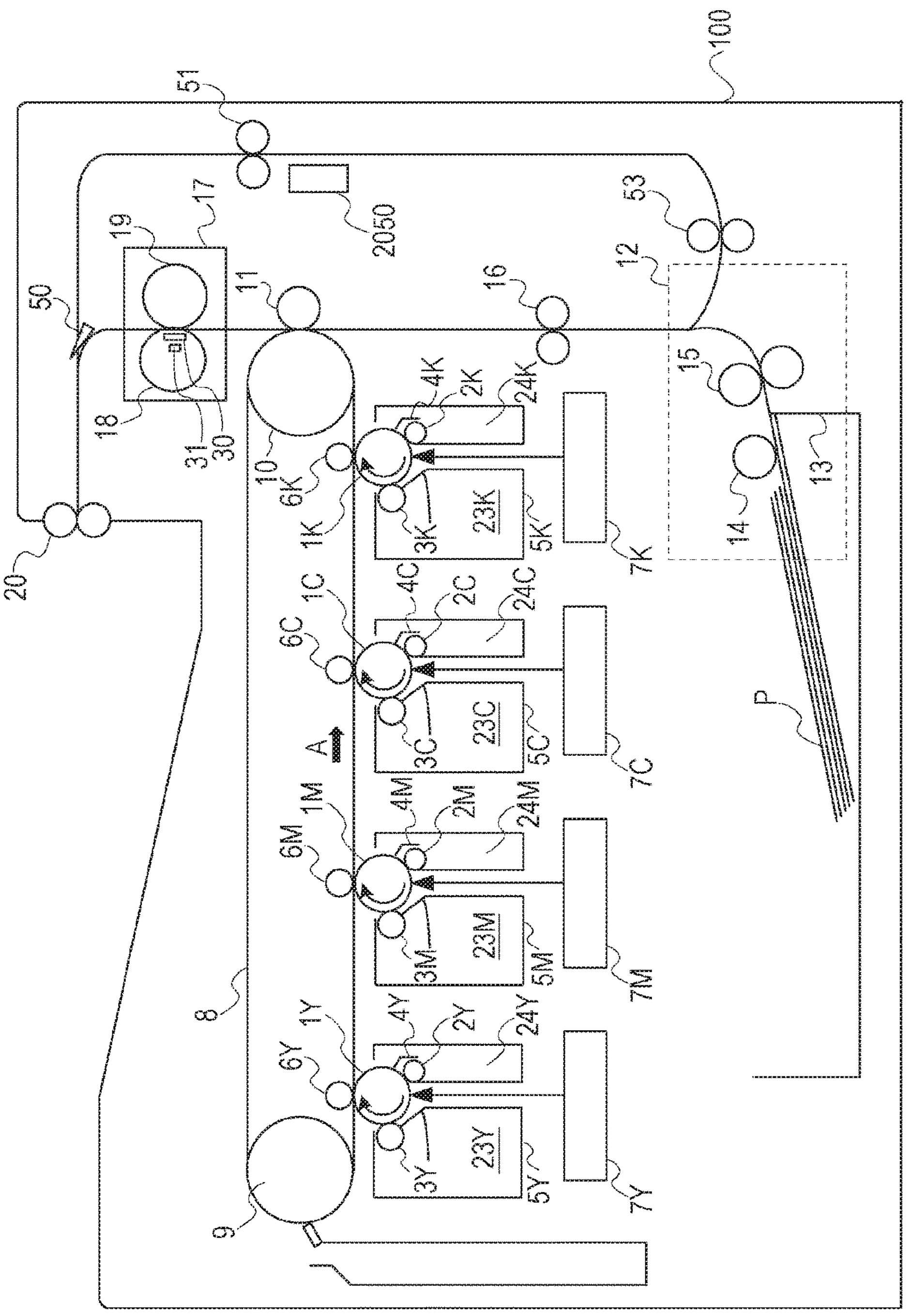

[Fig. 2]
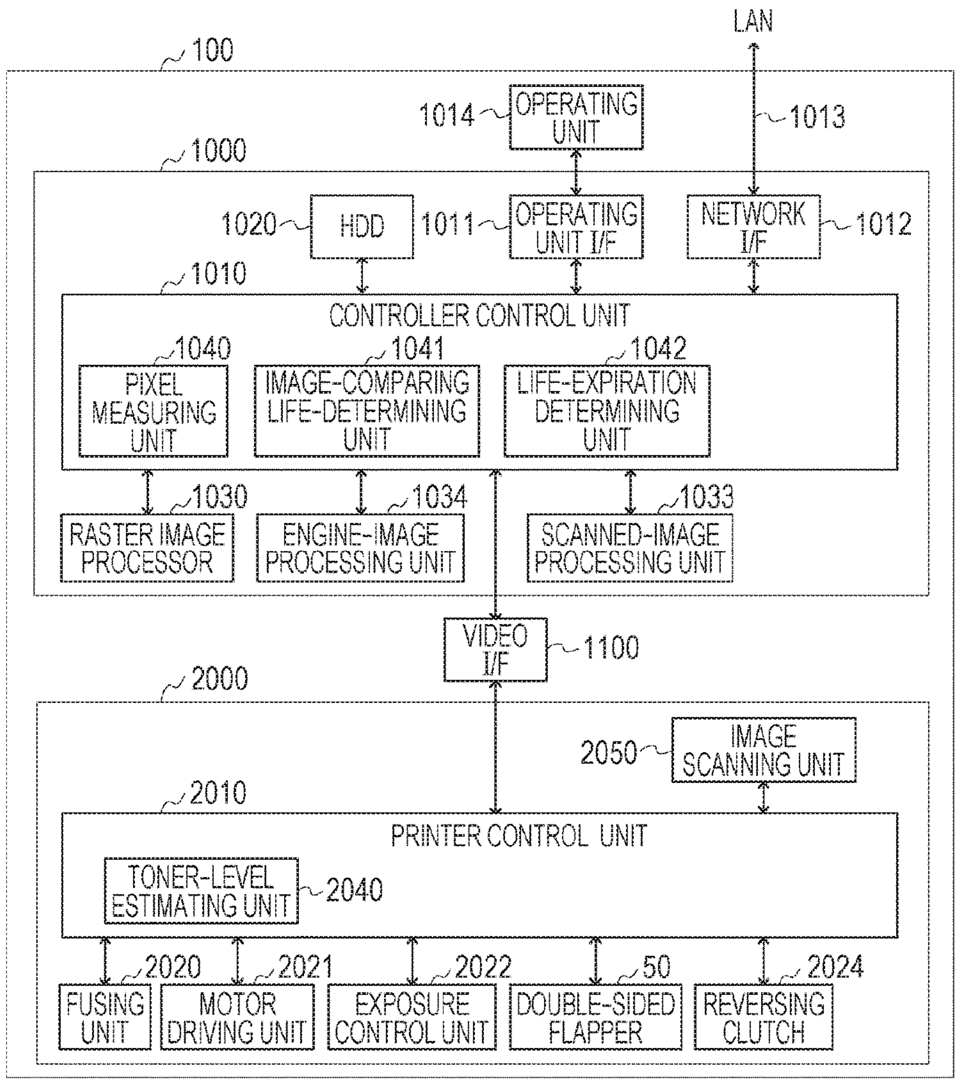

[Fig. 3]
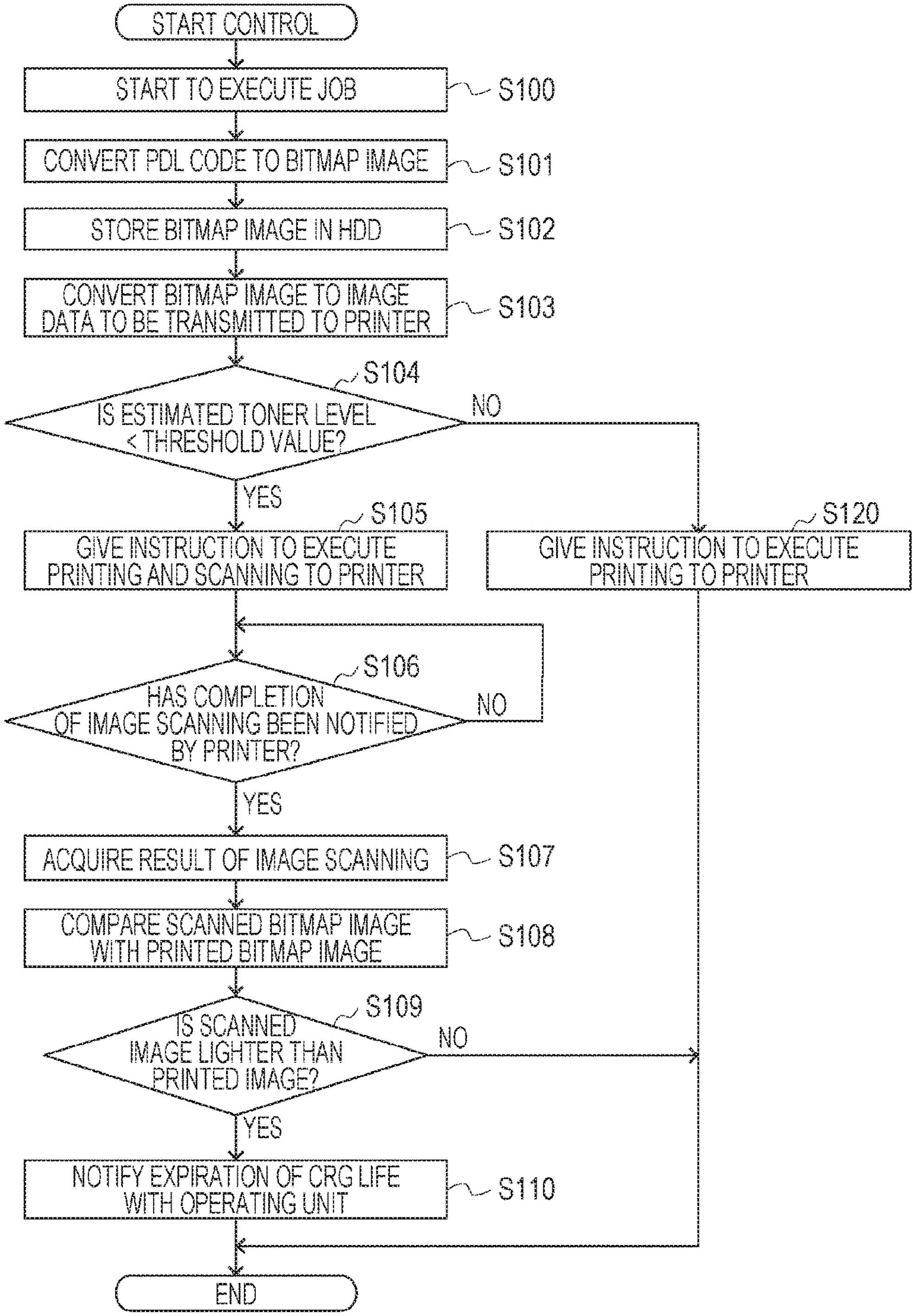

[Fig. 4]
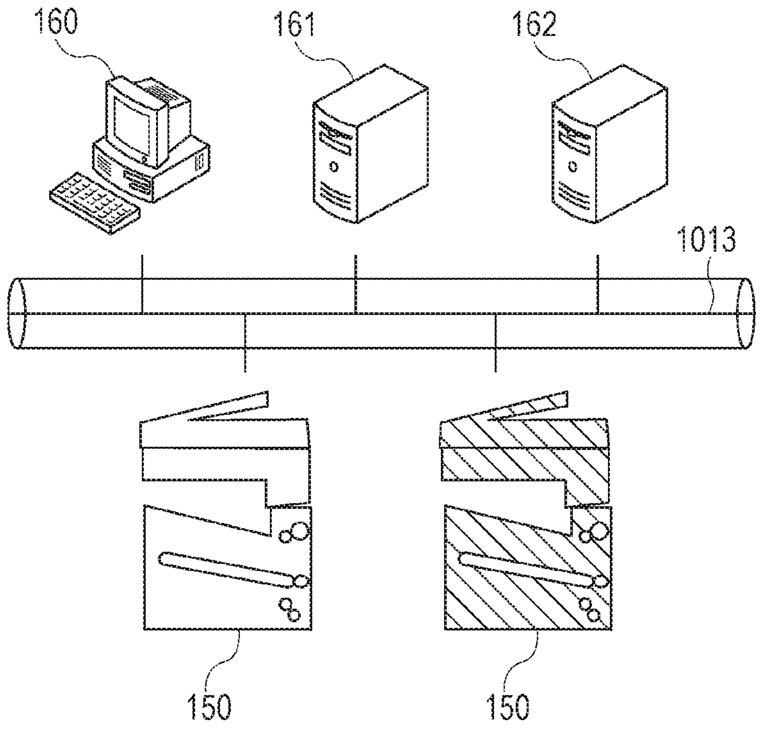

[Fig. 5]
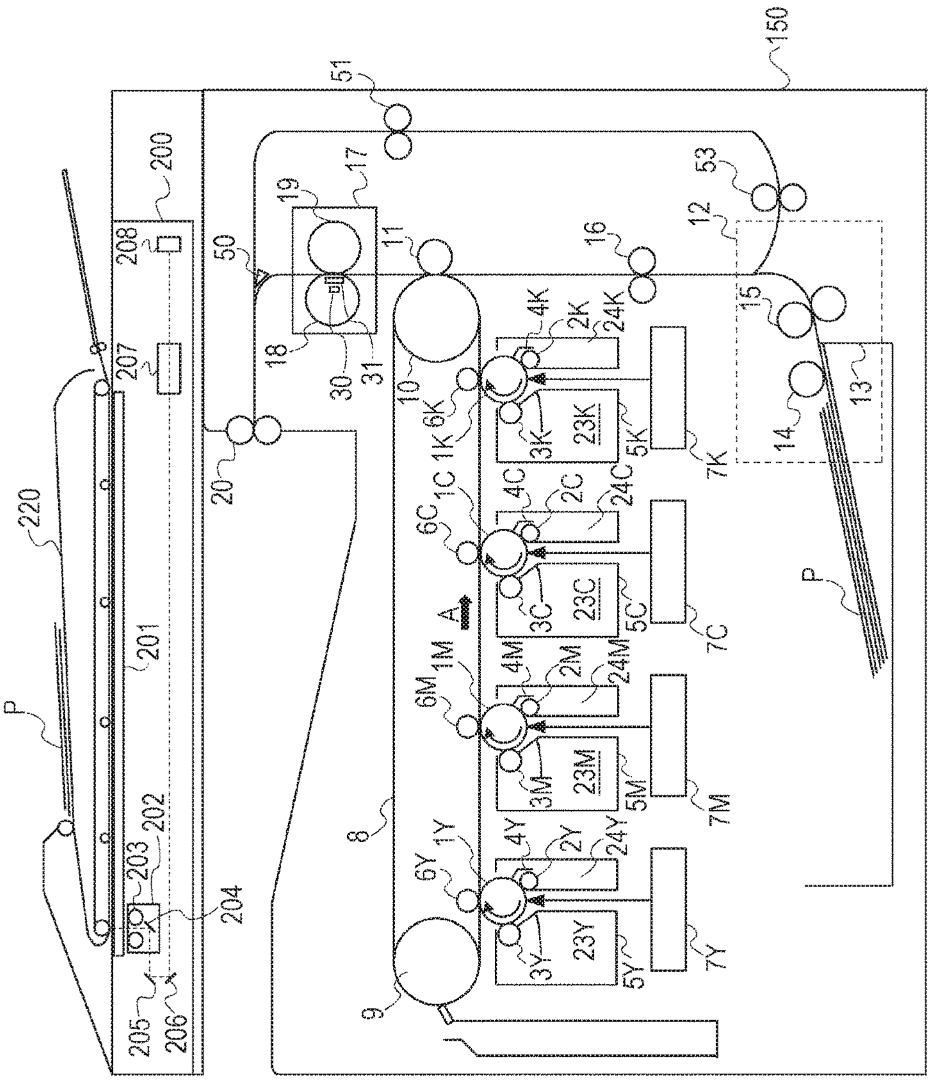

[Fig. 6A]
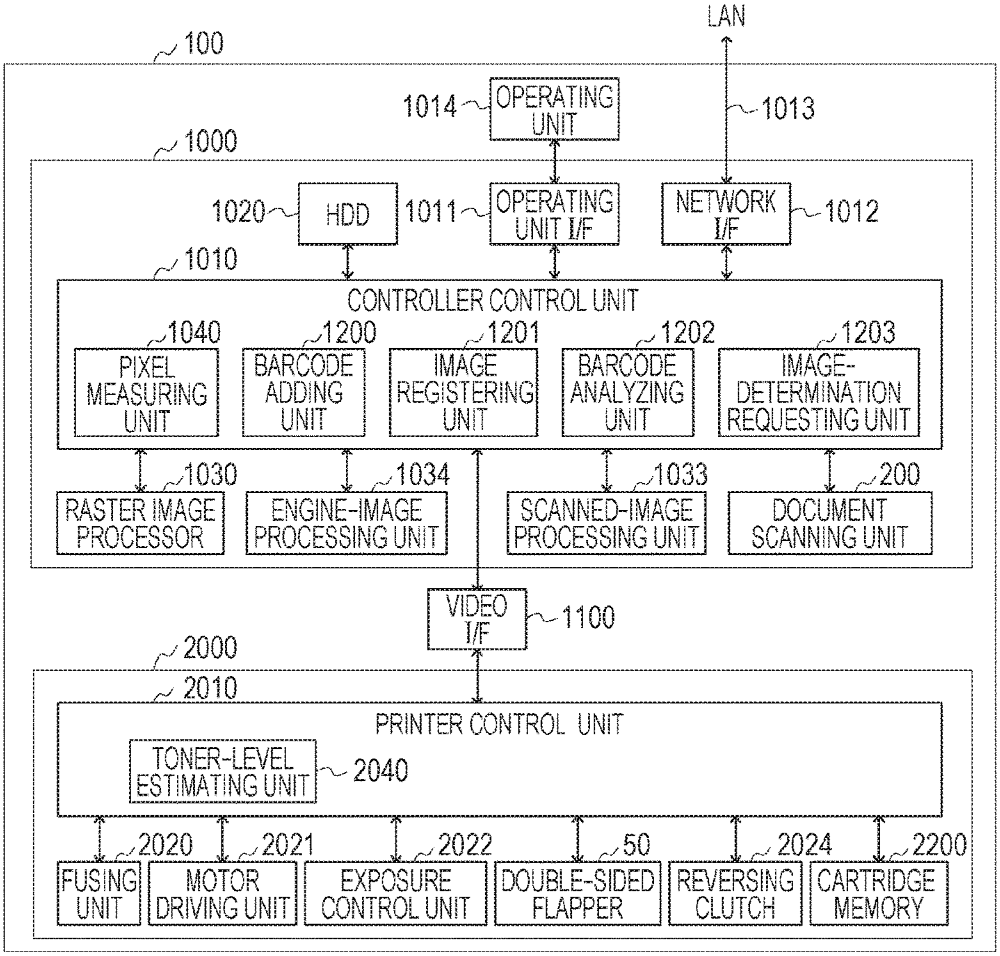
[Fig. 6B]
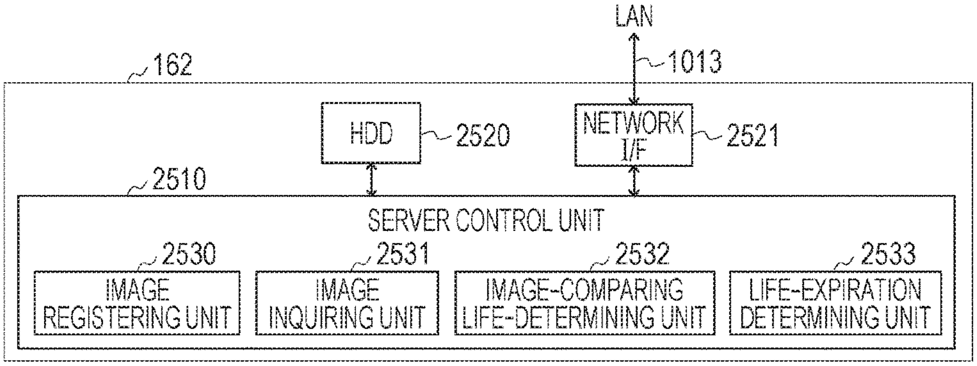

[Fig. 7]

| PRINT DATE (5000) | PRINTER SN (5001) | PAGE COUNT (5002) | IMAGE ANALYSIS REQUEST (5003) | CRG SN (5004) | | | |
|---|---|---|---|---|---|---|---|
| | | | | Y | M | C | BK |
| 01/01/2014 9:00:00 | 00000012 | 1000 | TRUE | 1312010010 | 1312020020 | 1312030030 | 1312040040 |

[Fig. 8]
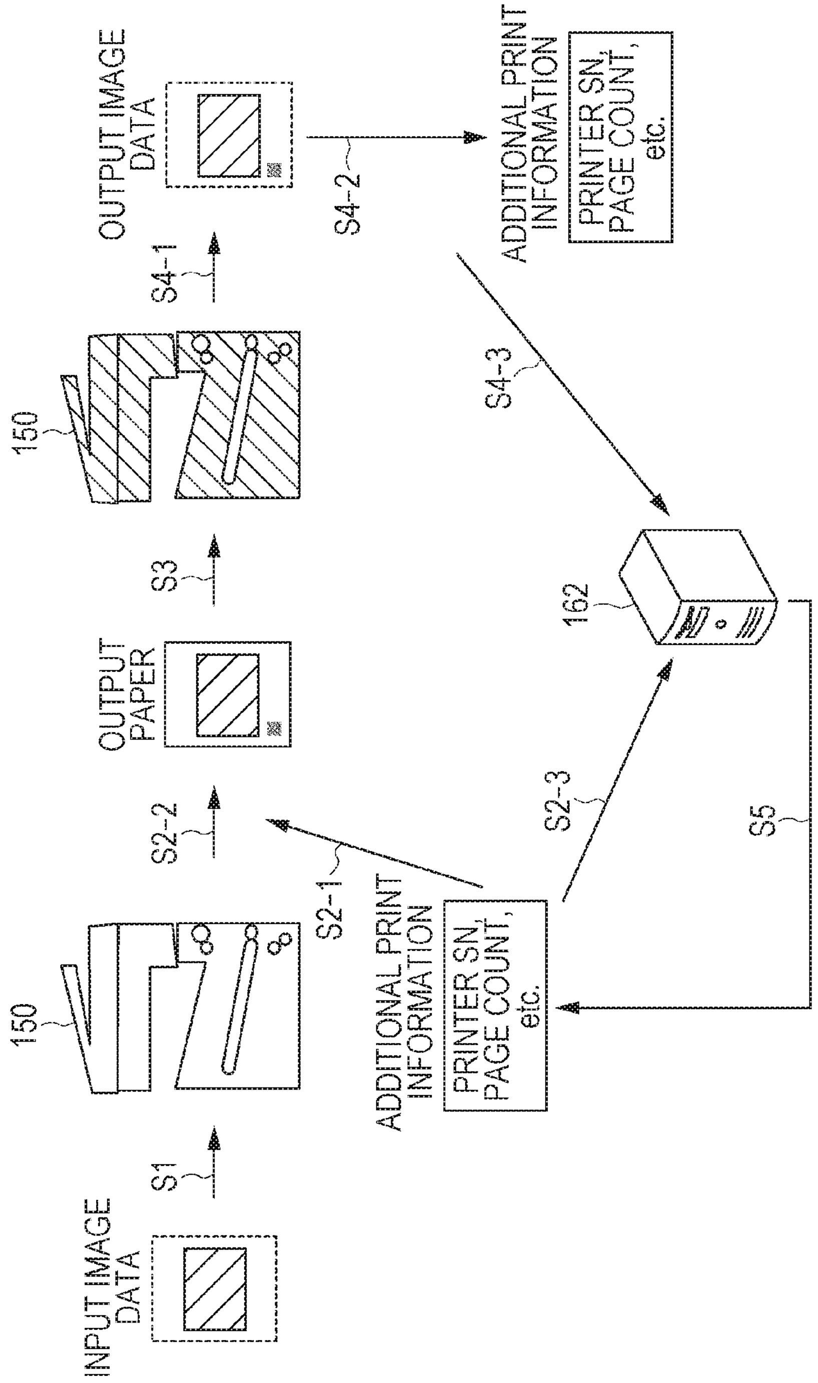

[Fig. 9]
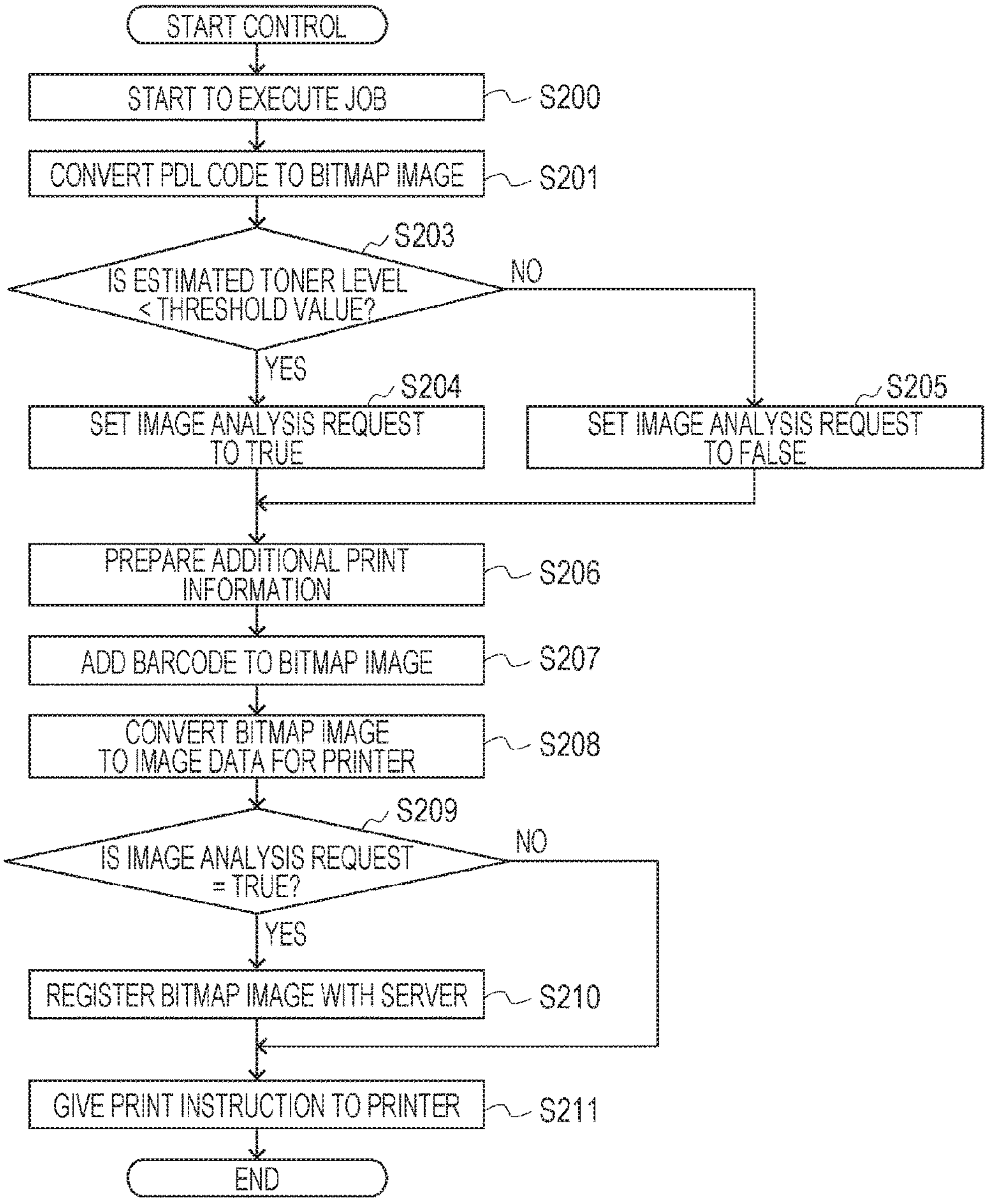

[Fig. 10]
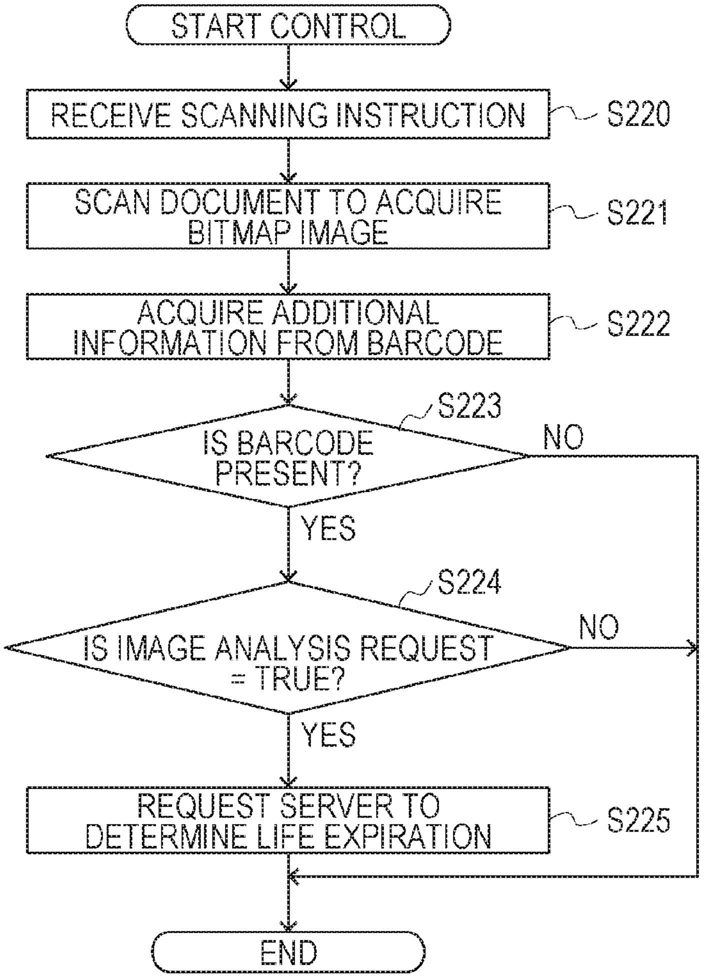

[Fig. 11]
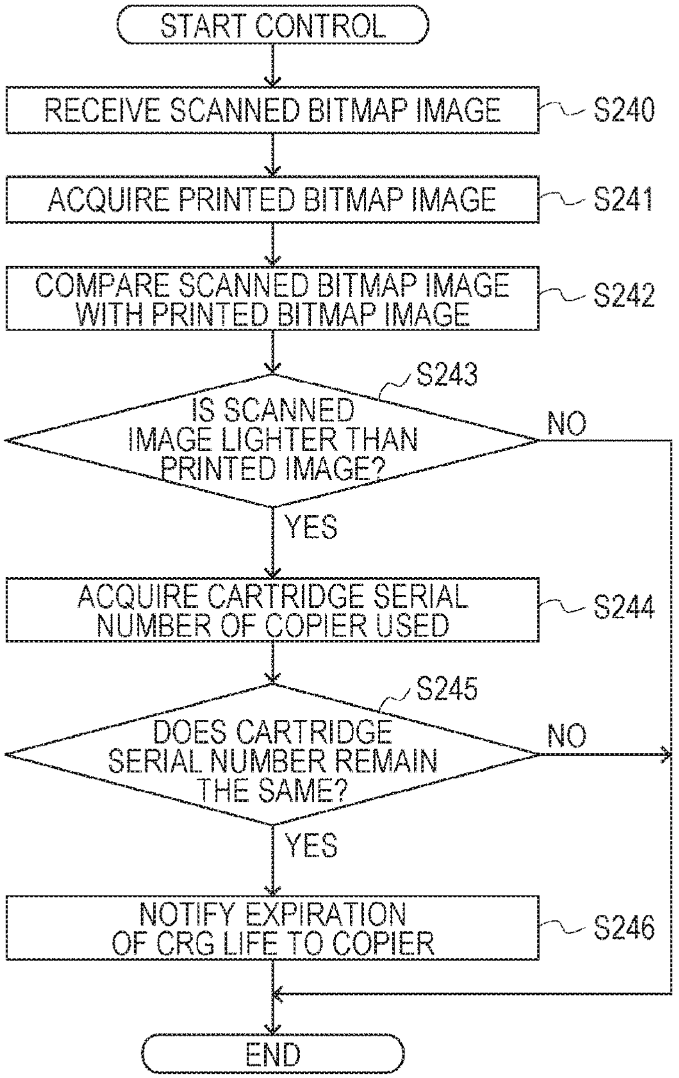

[Fig. 12]
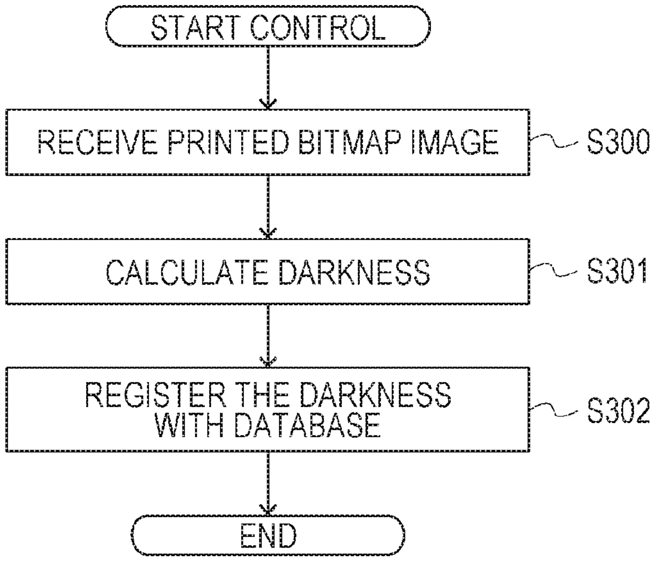

[Fig. 13]
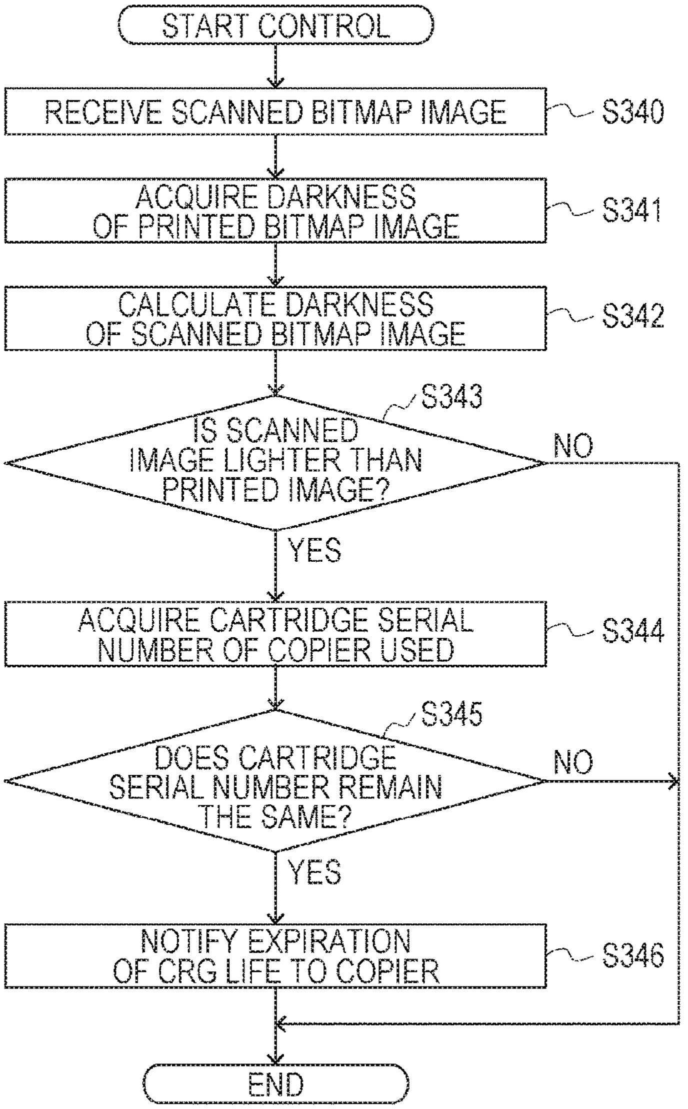

APPARATUS AND SYSTEM FOR FORMING IMAGE

CROSS-REFERENCE TO RELATED APPLICATIONS

This application is a National Phase application of International Application No. PCT/JP2016/000310, filed Jan. 21, 2016, which claims the benefit of Japanese Patent Application No. 2015-032064, filed Feb. 20, 2015. The disclosures of the above-named applications and patent are hereby incorporated by reference herein in their entirety.

TECHNICAL FIELD

The present invention relates to an apparatus for evaluating the state of a member for use in forming an image.

BACKGROUND ART

Electrophotographic and ink-jet image forming apparatuses (printers, copiers, facsimile machines, etc.) are generally configured to allow consumable items to be replaced. When an image forming apparatus detects the lives of these replaceable consumable items (also referred to as replaceable items) and determine that the lives have expired and these items should be replaced, the image forming apparatus displays a message that prompts a user or a serviceperson to replace the replaceable items.

For example, in electrophotographic image forming apparatuses, toner cartridges and fusers are replaceable items. The image forming apparatuses detect the lives of such replaceable items. An example of a method for detecting the amount of toner in a toner cartridge is disclosed in PTL 1. This is a method for detecting a change in the amount of toner in the cartridge by detecting electrostatic capacitance. PTL 2 discloses a method for detecting the toner level using an LED and a photo-detector. An example of a method for indirectly estimating the amount of toner is disclosed in PTL 3. This is a method for estimating toner consumption on the basis of image information (pixel count).

However, the replaceable items in the image forming apparatuses vary in dimensional tolerance among replaceable items and in operating environment of the user. This can cause a difference in the degree of degradation among replaceable items, making it difficult to accurately detect the expiration of the lives of the individual replaceable items. If a uniform threshold value for determining the lives is set, the user sometimes cannot use up the replaceable items to the proper expiration of their lives. Although the above methods allow accurate detection of the amount of toner, the methods require a dedicated sensor, leading to a complicated configuration and an increase in cost.

CITATION LIST

Patent Literature

PTL 1: Japanese Patent Laid-Open No. 5-6092
PTL 2: Japanese Patent Laid-Open No. 7-140776
PTL 3: Japanese Patent Laid-Open No. 2001-318566

SUMMARY OF INVENTION

The present invention provides an apparatus and a system capable of accurately detecting the life of replaceable items with a simple configuration.

An image forming apparatus according an aspect of the present invention includes a member for use in forming an image on a recording material, an acquiring unit configured to acquire first image information on the image formed on the recording material, a scanning unit configured to scan the image formed on the recording material to acquire second image information; and a control unit configured to determine a state of the member, wherein in a case that a usage amount of the member is larger or equal to a threshold, the control unit compares the first image information with the second image information, and determines the state of the member based on a comparison result.

An image forming system according to another aspect of the present invention includes an image forming apparatus, an external device communicating with the image forming apparatus, wherein the image forming apparatus comprises a member for use in forming an image on a recording material, wherein the external device comprises a storage unit configured to store first image information on the image formed on the recording material; and a control unit configured to determine a state of the member, wherein in a case that a usage amount of the member is larger or equal to a threshold, the control unit compares the first image information with the second image information, and determines the state of the member based on a comparison result.

Further features of the present invention will become apparent from the following description of exemplary embodiments with reference to the attached drawings.

BRIEF DESCRIPTION OF DRAWINGS

FIG. 1 is a schematic diagram of an image forming apparatus according to a first embodiment of the present invention.

FIG. 2 is a block diagram of a system configuration of the image forming apparatus according to the first embodiment.

FIG. 3 is a flowchart for determining the life of process cartridges of the first embodiment.

FIG. 4 is a diagram illustrating a network configuration according to a second embodiment.

FIG. 5 is a schematic diagram of an image forming apparatus according to the second embodiment of the present invention.

FIG. 6A is a block diagram of the system configuration of the image forming apparatus of the second embodiment.

FIG. 6B is a block diagram of the system configuration of a server according to the second embodiment.

FIG. 7 is a diagram illustrating entries of additional print information according to the second embodiment.

FIG. 8 is a conceptual diagram of the sequence of determining the lives of replaceable items according to the second embodiment.

FIG. 9 is a flowchart for the operation of a controller for printing an image according to the second embodiment.

FIG. 10 is a flowchart for the operation of the controller for scanning an image according to the second embodiment.

FIG. 11 is a flowchart for the operation of the server for determining the expiration of the lives of the cartridges according to the second embodiment.

FIG. 12 is a flowchart for the operation of the server for determining the expiration of the lives of the cartridges when instructed to register image data according to a third embodiment of the present invention.

FIG. 13 is a flowchart for the operation of the server for determining the expiration of the lives of the cartridges according to the third embodiment.

DESCRIPTION OF EMBODIMENTS

Embodiments of the present invention will be described hereinbelow with reference to the drawings. It is to be understood that the following embodiments do not limit the invention according the scope of the claims and that not all of combinations of the features described in the embodiments are essential for the solution of the invention.

First Embodiment

In this embodiment, a method for determining whether replaceable items used in an image forming apparatus have come to the end of the lives on the basis of image data printed on a recording material (hereinafter referred to as "paper") and scanned image data acquired by scanning printed paper will be described.

Referring first to FIG. 1, the general arrangement, in outline, of an electrophotographic color-image forming apparatus for use in describing this embodiment will be described. The image forming apparatus according to this embodiment is a laser printer 100 using an electrophotographic image forming process. The color-image forming apparatus shown in FIG. 1 includes process stations (process cartridges) 5Y, 5M, 5C, and 5K detachable from the printer 100. The four cartridges 5Y, 5M, 5C, and 5K have the same structure but differ in forming images with toners (developers) of different colors, that is, yellow (Y), magenta (M), cyan (C), and black (K). The signs Y, M, C, and K will be omitted except when a specific cartridge is described. Each of the cartridges 5 includes a toner container 23, a photosensitive drum 1 (a photoconductor), a charging roller 2, a developing roller 3, a cleaning blade 4 (a photoconductor cleaning unit), and a waste-toner container 24. An exposing unit 7 disposed below each cartridge 5 exposes the photosensitive drum 1 to light in response to an image signal according to image data.

The photosensitive drum 1 is uniformly charged to a predetermined polarity and a predetermined potential by the charging roller 2 during rotation. The photosensitive drum 1 is then exposed to light by the exposing unit 7 to form an electrostatic latent image corresponding to one of first to fourth color component images (yellow, magenta, cyan, and black component images) of a target color image. The charging roller 2 rotates together with the rotation of the photosensitive drum 1. The electrostatic latent image formed on the photosensitive drum 1 is developed by the developing roller 3 of corresponding one of the first to fourth cartridges Y, M, C, and K. A corresponding color toner is attached to the electrostatic latent image on the photosensitive drum 1 via the developing roller 3 to develop a toner image. The toner in the toner containers 23 is a negatively charged non-magnetic single-component toner, and the electrostatic latent images are developed using a non-magnetic single-component contact developing method. A voltage is applied to the developing roller 3 from a power source (not shown) to perform development.

An intermediate transfer belt unit includes an intermediate transfer belt 8, a driving roller 9, and a secondary-transfer facing roller 10. A primary transfer roller 6 is disposed inside the intermediate transfer belt 8 in such a manner as to be opposed to each photosensitive drum 1. A positive-polarity primary transfer bias is applied to the primary transfer roller 6 from a primary transfer bias source (not shown). The intermediate transfer belt 8 is run as the driving roller 9 is rotated by a motor (not shown), and the secondary-transfer facing roller 10 is also rotated therewith. Each photosensitive drum 1 rotates in the direction of arrow, the intermediate transfer belt 8 rotates in the direction of arrow A, and a positive-polarity primary transfer bias is applied to the primary transfer roller 6. This causes toner images on the photosensitive drums 1 to be primarily transferred onto the intermediate transfer belt 8 in order from a toner image on the photosensitive drum 1Y. The toner image in which four colors overlap with one another is conveyed to a secondary transfer roller 11. The cleaning blade 4 on the photosensitive drum 1 is pressure-contact with the photosensitive drum 1 to remove toner that has not been transferred to the intermediate transfer belt 8 and remains on the surface of the photosensitive drum 1 and other residues on the photosensitive drum.

The feeding conveying unit 12 includes a paper cassette 13 for accommodating paper P, a feed roller 14 for feeding the paper P from the paper cassette 13, and a conveying roller pair 15 for conveying the fed paper P. The paper P conveyed from the feeding conveying unit 12 is conveyed to the secondary transfer roller 11 by a resist roller pair 16. In transfer of the image from the intermediate transfer belt 8 onto the paper P, the four-color toner image on the intermediate transfer belt 8 is secondarily transferred to the conveyed paper P by applying a positive-polarity bias to the secondary transfer roller 11 (hereinafter referred to as "secondary transfer").

The paper P to which the toner image is transferred is conveyed to a fuser 17. The fuser 17 is a film-heating fuser including a fusing roller 18, in which a fusing heater 30 and a temperature sensor 31 for measuring the temperature of the fusing heater 30 are disposed, and a pressure roller 19 for coming into contact with the fusing roller 18. The toner image is fixed by heating and pressing the paper P, and the paper P is discharged out of the printer 100 as an image-formed material (such as printed paper). The printer 100 is capable of printing on two sides of the paper P. The printer 100 further includes an image scanning unit 2050 on the conveying path for two-sided printing. The image scanning unit 2050 provides a scanning function for obtaining a paper P scan image.

For two-sided printing of the paper P, after the rear end of the paper P that has passed through the fuser 17 passes through a two-sided flapper 50, the position of the two-sided flapper 50 is switched to the two-sided conveying path. The rotating direction of a discharge roller pair 20 is switched to the two-sided conveying path by a reversing clutch 2024 (not shown in FIG. 1) that determines the rotating direction of the discharge roller pair 20. This causes the conveying direction of the paper P to be reversed to the two-sided conveying path. On the two-sided conveying path, the paper P is conveyed to the resist roller pair 16 by a two-sided conveying roller pair 51 and a main-body merging roller pair 53. From the resist roller pair 16 onward, the paper P is processed similarly to the front surface and is discharged out of the printer 100 through the fuser 17.

To scan the surface of the paper P with the image scanning unit 2050, the paper P is conveyed to the two-sided conveying path as for the above-described two-sided printing, and at the timing when the paper P passes through the two-sided conveying roller pair 51, the image scanning unit 2050 starts to scan the surface of the paper P. The image scanning unit 2050 includes a light-emitting device and a contact image sensor (CIS) (not shown). The image scanning unit 2050 photoelectrically scans the image on the paper P being conveyed into time-series digital pixel signals and accumulates the signals as scanned image data in a memory in the image scanning unit 2050. The paper P after the image scanning is completed passes through the paper conveying path and is discharged out of the printer 100.

Control Block Diagram

FIG. 2 is a control block diagram of the printer 100 of this embodiment. The printer 100 includes a controller 1000 and an engine 2000. The controller 1000 is a controller for inputting and outputting image information and device information by connecting to the engine 2000, which is an image output device, and to a LAN 1013. A controller control unit 1010 is a CPU that controls the whole image forming system and includes a RAM (not shown) serving as a work memory and a ROM (not shown) in which a boot program is stored. A hard disk drive (HDD) 1020 stores system software and image data. A pixel measuring unit 1040, an image-comparing life-determining unit 1041, and a life-expiration determining unit 1042 are functions of the software stored in the HDD 1020 that the controller control unit 1010 executes. An operation unit I/F 1011 is an interface to an operation unit 1014 including a touch panel and outputs image data to be displayed on the operation unit 1014 to the operation unit 1014. The operation unit I/F 1011 also has a function of communicating information input by the user of this system from the operation unit 1014 to the controller control unit 1010. A network I/F 1012 connects to the LAN 1013 to input and output (communicate) information. A raster image processor 1030 develops a PDL code into a bitmap image. An engine-image processing unit 1034 converts the bitmap image developed by the raster image processor 1030 to image data to be transmitted to the engine 2000 through correction and conversion of the resolution of the bitmap image. A scanned-image processing unit 1033 corrects, processes, and edits the input image data obtained by scanning with the image scanning unit 2050.

The controller control unit 1010 and an engine control unit 2010 are connected together via a video I/F 1100. The controller control unit 1010 gives an operating instruction and transmits image data to the engine control unit 2010 via the video I/F 1100. The engine 2000 is an image output device. The engine control unit 2010 operates the individual units in the engine 2000 via the video I/F 1100 to perform printing on the paper P according to an instruction from the controller 1000. The engine control unit 2010 is a CPU that controls the whole engine 2000 and includes a RAM (not shown) and a ROM (not shown) in which programs for controlling the engine 2000 are stored. A toner-level estimating unit 2040 is a function of a program stored in the ROM that the engine control unit 2010 executes.

The engine control unit 2010 includes a motor (not shown) for driving a fusing unit 2020 for energizing the fuser 17 and the photosensitive drums 1, the intermediate transfer belt 8, the pressure roller 19, and other components of the printer 100. The engine control unit 2010 is connected to a motor driving unit 2021 for driving the motor, an exposure control unit 2022 for controlling the exposing units 7, the two-sided flapper 50 for switching the conveying path of the paper P during two-sided printing, and the reversing clutch 2024 for switching the rotating direction of the discharge roller pair 20. A toner image is thus printed on the paper P by electrophotographic process on the basis of image data transmitted from the controller 1000 via the video I/F 1100.

The engine control unit 2010 is also connected to the image scanning unit 2050. When an image on the front of the paper P is to be scanned, the engine control unit 2010 gives a scanning instruction to the image scanning unit 2050 before the paper P reaches the image scanning unit 2050. After the paper P passes through the image scanning unit 2050, the engine control unit 2010 notifies the controller control unit 1010 of completion of image scanning. The controller control unit 1010 acquires scanned image data accumulated in the image scanning unit 2050 via the video I/F 1100.

The functions of the controller 1000 and the engine 2000 may be implemented by the individual CPUs executing the individual control programs, or alternatively, part or all of the functions may be implemented by application specific integrated circuits (ASICs).

Detection of Toner Level and Determination of Image

When the amount of toner in the toner container 23 decreases, the amount of toner supplied to the latent image decreases, and the toner image cannot have necessary darkness. The toner is stirred in the process cartridges 5 and is subjected to friction due to stirring members in the cartridges 5. The friction causes an external additive on the surface of the toner to fall off, thereby gradually reducing the charging characteristics. The reduction in charging characteristics decreases the darkness of the toner image. Because of this, after the toner has reached the end of the life, the toner image cannot have desired darkness. When the toner degrades and cannot have desired image darkness, the printer 100 needs to detect that the life of the toner has expired and to notify the user of the expiration to prompt the user to replace the process cartridge 5.

In this embodiment, measurement of the amount of remaining toner uses a method of estimation based on the number of pixels. The pixel measuring unit 1040 in the controller control unit 1010 measures the toner level by counting the numbers of pixels of YMCK colors from a bitmap image developed from a PDL code by the raster image processor 1030. When the controller control unit 1010 gives a print instruction to the engine control unit 2010, the controller control unit 1010 notifies the number of pixels of an image to be printed to the engine control unit 2010. The toner-level estimating unit 2040 in the engine control unit 2010 adds up the number of pixels notified. The toner-level estimating unit 2040 has a threshold value of the number of pixels for use in determining whether the toner in the process cartridges 5 has come to the end of life according to the amount of toner. The toner-level estimating unit 2040 estimates the toner level from the total pixel count and the threshold value of the pixel count and notifies the toner level to the controller control unit 2010. The controller control unit 1010 displays a message to prompt the user to replace the process cartridge 5 on the operation unit 1014 according to the estimated toner level received from the engine control unit 2010.

However, depending on the kind of image to be printed or the environment around the printer 100, the pixel count does not always correspond to the amount of toner actually consumed level. This causes errors to be cumulated as the number of sheets printed increases, making it difficult to accurately estimate the life. In this embodiment, print image data, which is first image information to be printed on the paper P, is compared with scanned image data, which is scanned second image information, using the image scanning unit 2050 of the image forming apparatus to determine whether the process cartridge 5 has expired. When the amount or the quality of toner decreases, the toner becomes unable to have desired darkness (becomes lighter than desired darkness), as described above. This embodiment compares the scanned image data with the print image data by using this poor image characteristics to determine whether the toner on the printed paper P has desired darkness, thereby determining whether the life of the toner has expired. However, the darkness of the toner decreases also when the amount of laser from the exposing unit 7 decreases. Accordingly, if something unusual occurs in the exposing unit 7, using only information on the toner darkness will lead to misdetermination on the life of the cartridge 5. This embodiment allows accurate determination on the lives of the cartridges 5 by combining the life determination by comparing a scanned image and a printed image with the life determination using a pixel count.

Flowcharts 1

FIG. 3 is a flowchart for the operation of the controller control unit 1010 for determining whether the life of the process cartridge 5 has expired from a scanned image acquired by scanning an image printed on the paper P by using the image scanning unit 2050. The steps of starting and terminating the control are the start and the end of the program and descriptions thereof will be omitted (the same applies to all the following flowcharts).

A job described in a page description language (PDL) is transmitted to the printer 100 via the LAN 1013, and the controller control unit 1010 starts to execute the job (S100). The controller control unit 1010 converts the transmitted PDL to a bitmap image with the raster image processor 1030 (S101). The controller control unit 1010 stores the generated bitmap image in the HDD 1020 (S102). The bitmap image is converted to image data to be transmitted to the engine 2000 with the engine-image processing unit 1034 (S103). The controller control unit 1010 then determines whether the estimated toner levels of the individual process cartridges 5, which have been received from the engine control unit 2010 at the job starting point, are lower than a predetermined threshold value (S104). The threshold value used at S104 is a toner level that the toner-level estimating unit 2040 has notified at the point when an actual toner level has come to the end of life on the assumption that an error of a toner level estimated using a pixel count from the actual toner level, which is acquired by experiment, has occurred at all pages.

If the estimated toner level is higher than or equal to the threshold value, the controller control unit 1010 issues an instruction to start printing to the engine 2000 as usual to execute printing (S120). If the estimated toner level is lower than the threshold value, the controller control unit 1010 issues an instruction to print an image on the paper P and to scan the printed image using the image scanning unit 2050 to the engine 2000 (S105). The engine 2000 prints the image on the paper P on the basis of the image data from the controller 1000 and scans the image printed on the paper P with the image scanning unit 2050 while conveying the printed paper P to the two-sided conveying path. When the controller 1000 is notified of completion of image scanning by the engine 2000 (S106), the controller 1000 acquires a bitmap image of the scanned image from the engine 2000 (S107). The controller 1000 compares the printed bitmap image stored in the HDD 1020 with the scanned bitmap image using the image-comparing life-determining unit 1041 (S108). The image-comparing life-determining unit 1041 converts the printed bitmap image and the scanned bitmap image from RGB data to CMYK data. The image-comparing life-determining unit 1041 calculates the average darkness of the individual CMYK colors for each of the CMYK data on the printed image and the CMYK data on the scanned image. For a color whose estimated toner level is determined at S104 to be lower than the threshold value, the image-comparing life-determining unit 1041 determines whether the average darkness of the scanned image is smaller than (lighter than) the average darkness of the printed image by a predetermined threshold value or more (S109). If it is determined that the scanned image is lighter than the printed image, the life-expiration determining unit 1042 determines that the toner has come to the end of the life because the toner may be degraded, so that sufficient darkness of the image cannot be ensured, and the controller control unit 1010 prompts the user to replace the process cartridge 5 with the operation unit 1014 (S110). The threshold value used at S109 is set to a value that will not lead to misdetermination on life during image analysis on the basis of data on variation in darkness when the engine 2000 prints an image on the paper P.

This is a method for determining whether the lives of the cartridges 5 of an image forming apparatus including an image scanner have expired from the analysis of a printed image and a scanned image.

Thus, the embodiment of the present invention allows the lives of replaceable items of an image forming apparatus including an image scanning unit to be determined from the analysis of a printed image and a scanned image. Since the expiration of the lives of replaceable items is determined from images, the expiration of the lives can be accurately detected without adding hardware for detecting the expiration of the lives.

This method allows higher accuracy detection of expiration of lives than that using a method of indirect detection using an estimated toner pixel count or a rotating time. Furthermore, this embodiment uses a combination of life determination based on image analysis and life determination based on a pixel count, thereby preventing misdetermination that replaceable items have expired because of a change in image characteristics due to a defect of the image forming apparatus. Furthermore, the image analysis is executed only under a situation in which cartridges seem to have come close to the end of lives from the result of determination based on the pixel count. This can reduce the number of times of analysis if determination of life based on image analysis takes much time. If a defect can be accurately specified only from image analysis, there is no need to use a pixel count. In this case, the embodiment can also be applied to defects in a component if not only a decrease in durability but also an unexpected problem exert an influence on the images, for example, low printing accuracy due to a problem of a paper conveying component caused by an impact.

In this embodiment, a method for determining the time to replace the cartridges 5 using image analysis focusing on the darkness of images has been described. This embodiment is applicable to replaceable items that decrease in durability, such as the photoconductor 1, the intermediate transfer belt (intermediate transfer member) 8, the fusing roller 18 and the pressure roller 19 of the fuser 17, and the feed roller 14 of the feeding conveying unit 12. For this purpose, an algorithm for analyzing signs in images peculiar to the individual replaceable items caused according to degradation is prepared. For the above replaceable items, for example, individual driving times are measured and accumulated, and control (for determining whether the accumulated driving time is larger than or equal to a threshold value) is performed on the basis of the measured driving time.

In this embodiment, the image forming apparatus is a color laser printer. This method can also be applied to printers with other configurations, such as a monochrome laser printer and an ink-jet printer. While in this embodiment the image scanning unit is disposed on the two-sided conveying path, any image scanning units capable of scanning printed paper, for example, a scanning unit separately disposed above an image forming apparatus, may be used.

Second Embodiment

This embodiment assumes a situation in which a copier including an image forming apparatus and a scanning unit is connected to a network. For example, this embodiment is characterized in that, when a user scans paper P that is printed with one of copiers connected to a network, the lives of replaceable items of the copier that prints the paper P are determined. In the drawings of this embodiment, the same functions as those of the first embodiment are given the same reference signs and descriptions thereof will be omitted.

FIG. 4 is a diagram illustrating the network configuration of this embodiment. This network configuration includes a host PC 160, a print server 161, a life-expiration determining server 162, and one or more copiers 150 connected to the LAN 1013.

The host computer 160 has functions of editing an application file by a user and transmitting jobs to the print server 161. The main roles of the print server 161 are transmission and reception of information to and from devices outside a printing unit and management control of the printing unit. Jobs input from the host computer 160 are centrally managed by the print server 161, so that the statuses of all the copiers 150 connected to the LAN 1013 and all the jobs can be monitored and controlled (e.g., job pause). The copiers 150 have functions of printing jobs transmitted from the print server 161, scanning and copying documents of the user. The life-expiration determining server 162 is a server for determining the expiration of the lives of replaceable items in the copier 150.

FIG. 5 is a diagram illustrating the internal configuration, in outline, of the copiers 150. This is the configuration of a typical copier in which a document scanning unit 200 applies light onto a document placed on a platen to scan the document. Descriptions of the same functions as those of the image forming apparatus of the first embodiment will be omitted. The document scanning unit 200 includes a platen glass 201 serving as a document table, a scanner 202, a document lighting lamp 203, and scanning mirrors 204, 205, and 206, a lens 207, and an image sensor 208 and scans a document conveyed by an automatic document feeder (DF) 220. In the document scanning unit 200, the scanner 202 reciprocates in predetermined directions with a motor (not shown), and light reflected by the document passes through the lens 207 via the scanning mirrors 204, 205, and 206 and forms an image on a CCD sensor in the image sensor 208. The image sensor 208 includes a memory, in which RGB data based on signals of images formed on the CCD sensor is accumulated.

FIG. 6A is a block diagram of the image forming apparatus of this embodiment. A barcode adding unit 1200, an image registering unit 1201, a barcode analyzing unit 1202, and an image-determination requesting unit 1203 are functions of software that a controller operation unit 1010 stored in a HDD 1020 executes. The barcode adding unit 1200 is a function of adding additional print information to a bitmap image developed from a PDL code by a raster image processor 1030. Additional print information in this embodiment is illustrated in FIG. 7. Print date 5000 is time at which printing is performed by the copier 150. Printer SN 5001 is a serial number assigned to the copier 150 as distinguished from the other copiers 150. Page count 5002 is counted in the copier 150. Image analysis request 5003 is information indicating whether to determine the expiration of the life using an image analysis performed by the copier 150. CRG SN 5004 indicates the serial numbers of the individual process cartridges 5 used for printing by the copier 150. In this embodiment, the additional print information is embedded in the margin of a bitmap image to be printed as a two-dimensional code, for example, a QR code (a registered trademark, the rest is omitted). The additional print information may be another barcode other than the QR code or may be embedded using an electronic watermark technique.

The image registering unit 1201 is a function of transmitting print image data (a bitmap image) to which the additional print information is added and the additional print information to the life-expiration determining server 162 to register therein in association with each other. The barcode analyzing unit 1202 is a function of searching scanned image data (a bitmap image) scanned by the document scanning unit 200 for a QR code and analyzing the QR code, if found, to acquire the additional print information. The image-determination requesting unit 1203 is a function of transmitting the scanned image data scanned by the document scanning unit 200 and the additional print information acquired by the barcode analyzing unit 1202 to the life-expiration determining server 162 to request to determine the expiration of life on the basis of the images.

FIG. 6B is a block diagram of the life-expiration determining server 162. The life-expiration determining server 162 is connected to the LAN 1013 to register an image printed by the copier 150 and determine the lives of replaceable items on the basis of the scanned image data acquired by the copier 150.

A server control unit 2510 is a CPU that controls the whole life-expiration determining server 162 and includes a RAM (not shown) serving as a work memory and a ROM (not shown) in which a boot program is stored. A HDD 2520 is a hard disk drive that stores system software and image data. An image registering unit 2530, an image inquiring unit 2531, an image-comparing life-determining unit 2532, and a life-expiration determining unit 2533 are functions of the software stored in the HDD 2520 that the server control unit 2510 executes. A network I/F 2521 is connected to the LAN 1013 to input and output information.

The image registering unit 2530 registers a bitmap image of a printed image transmitted from the copier 150 with the HDD 2520 using the printer serial number 5001 and the page count 5002 in the additional print information as keys. The image inquiring unit 2531 acquires print image data (a bitmap image) from the HDD 2520 on the basis of the printer serial number 5001 and the page count 5002 in the additional print information transmitted when a request to determine the life is given from the image-determination requesting unit 1203. The image-comparing life-determining unit 2532 compares the print image data and the scanned image data to determine the lives of the process cartridges 5. The life-expiration determining unit 2533 checks whether a process cartridge 5 that has come to the end of life in the copier 150 used for printing has been replaced and instructs the copier 150 to replace the process cartridge 5. In this embodiment, when the image-comparing life-determining unit 2532 determines that the cartridges 5 has come to the end of life, the life-expiration determining unit 2533 inquires of the copier 150 the serial number of the mounted cartridge 5. If the result (serial number) is the same as the cartridge serial number stored in the additional print information, the life-expiration determining unit 2533 determines that the process cartridge 5 has not been replaced and instructs the copier 150 to replace the process cartridge 5.

Conceptual Diagram

FIG. 8 is a conceptual diagram of the sequence of determining the lives of the replaceable items by image analysis in the network configuration of this embodiment. A job that the user transmits from the host computer 160 is received by the copier 150 via the print server 161 (S1). The copier 150 embeds additional print information in the job data (S2-1) and prints the job data (S2-2). The copier 150 registers a printed image of the job data with the life-expiration determining server 162 (S2-3). The user that holds the printed paper issues an instruction to copy or scan the printed paper to one of the copiers 150 (S3). The copier 150 scans the data on the printed paper (S4-1) and extracts the additional print information from the output scanned image data (S4-2). The copier 150 transmits the scanned image and the additional print information to the life-expiration determining server to request to determine the life (S4-3). The life-expiration determining server 162 acquires the print image data registered at S2-3 on the basis of the additional print information extracted at S4-2 and compares the print image data with the scanned image data to determine the lives of the replaceable items. If it is determined that the life of any of the replaceable items is expired, the life-expiration determining server 162 issues an instruction to replace the replaceable item to the copier 150 used for printing (S5).

Flowcharts 2

The details of the control will be described with reference to flowcharts. FIG. 9 is a flowchart for the operation of the controller 1000 of the copier 150 when the user gives an instruction to print an image. FIG. 10 is a flowchart for the operation of the controller 1000 of the copier 150 when the user gives an instruction to scan a printed image. FIG. 11 is a flowchart for the operation of the life-expiration determining server 162 when the user gives an instruction to scan a printed image.

First, the flowchart for the operation of the controller 1000 of the copier 150 when the user gives an instruction to print an image will be described with reference to FIG. 9. A job described in a PDL is transmitted to the copier 150 via the LAN 1013, and the controller control unit 1010 starts to execute the job (S200). The controller control unit 1010 converts the transmitted PDL to a bitmap image with the raster image processor 1030 (S201). The controller control unit 1010 determines whether the estimated toner level of at least one of the process cartridges 5, which has received from the engine control unit 2010 at the job starting point, is lower than a threshold value (S203). If the toner level is lower than the threshold value, the controller control unit 1010 sets an image-analysis request flag to TRUE (S204), and if the toner level is not lower than the threshold value, the controller control unit 1010 sets the image-analysis request flag to FALSE (S205). The controller control unit 1010 then prepares the additional print information shown in FIG. 7 (S206). The print date 5000 is acquired from a real-time clock IC (not shown) of the copier 150. The printer SN 5001 and the page count 5002 are set from the information stored in the HDD 1020. The image analysis request 5003 is set from the image-analysis request flag set at S203 or S204. The cartridge serial number (CRG SN) 5004, which is identification information, is acquired from the cartridge memory 2200 by the engine control unit 2010. A QR code is added to the margin of the bitmap image on the basis of these additional print information (S207). The bitmap image is converted to a data format for the engine 2000 by the engine-image processing unit 1034 (S208). If the image-analysis request flag is TRUE, the bitmap image is registered with the life-expiration determining server 162 by the image registering unit 1201 (S209 and S210). The controller 1000 issues an instruction to start printing to the engine 2000 to perform printing (S211).

Next, the operation of the controller 1000 when the user gives an instruction to scan printed paper will be described with reference to FIG. 10. The controller 1000 receives an instruction to scan a document from the user (S220). The controller 1000 scans the document with the document scanning unit 200 to acquire a bitmap image (S221). Next, the barcode analyzing unit 1202 searches the scanned bitmap image for a QR code in the margin and extracts additional print information from the QR code, if present (S222). If the QR code is present (S223), the controller 1000 determines whether the image analysis request 5003 in the extracted additional print information is TRUE (S224). If the image analysis request 5003 is TRUE, the image-determination requesting unit 1203 transmits the scanned image to the life-expiration determining server 162 to request to determine the expiration of the life (S225).

The operation of the life-expiration determining server 162 will be described with reference to FIG. 11. The life-expiration determining server 162 receives additional print information and scanned image data (a bitmap image) transmitted from the copier 150 (S240). The image inquiring unit 2531 acquires print image data (a bitmap image) used for printing from the additional print information (S241). The image-comparing life-determining unit 2532 compares the scanned bitmap image with the bitmap image used for printing (S242). The image-comparing life-determining unit 2532 determines whether the average darkness of the scanned image is lower than (lighter than) the average darkness of the printed image by a predetermined threshold value, as the image-comparing life-determining unit 1041 of the first embodiment does (S243). If the average darkness of the scanned image is lighter (smaller than or equal to the threshold value), the life-expiration determining unit 2533 inquires of the copier 150 the serial numbers of cartridges 5 mounted at the present (S244). The image-comparing life-determining unit 2532 compares the cartridge serial numbers in the additional print information with the cartridge serial numbers received from the copier 150 to determine whether there is a difference (S245). If the cartridge serial numbers are the same, the cartridges 5 have not been replaced, and the image-comparing life-determining unit 2532 notifies the copier 150 that the cartridges 5 have come to the end of the lives to prompt to replace the cartridges 5 (S246).

This is a method for determining the lives of replaceable items of a copier used for printing from the analysis of the printed image and the scanned image when a user copies or scans printed paper.

Thus, according to this embodiment, when a user copies or scans printed paper under an environment in which a copier 150 or a single-function printer is connected to a network, the lives of the replaceable items of the device used for printing on the paper can be determined. This embodiment allows the lives of replaceable items to be determined by image analysis using the function of the existing printer, thus allowing the user to determine the lives of the replaceable items with no hassle operation.

While in this embodiment a device that the user uses for printing is the copier 150, a single-function printer having no image scanning function and only capable of printing may be used. Furthermore, while in this embodiment the items illustrated in FIG. 8 are defined as additional print information, the items are not limited to the items illustrated in FIG. 8 because any other items that specify a printed image for use in printing may be used. For example, the cartridge serial number 5004 may not be included in the additional print information but may be registered as date with the life-expiration determining server 162. While the image analysis is executed by the life-expiration determining server 162, the image analysis may be executed by a copier used for scanning or a copier used for printing.

This embodiment may also be applied to a configuration in which a scanning unit having only a function of scanning documents is connected to a network. The above life determination may be executed by scanning a document using one of a copier, a printer, and a scanner connected to a network.

As in first embodiment, this embodiment is applicable to replaceable items that decrease in durability, such as the photoconductor 1, the intermediate transfer belt (intermediate transfer member) 8, the fusing roller 18 and the pressure roller 19 of the fuser 17, and the feed roller 14 of the feeding conveying unit 12. For this purpose, an algorithm for analyzing signs in images peculiar to the individual replaceable items caused according to degradation is prepared. For the above replaceable items, for example, individual driving times are measured and accumulated, and control (for determining whether the accumulated driving time is larger than or equal to a threshold value) is performed on the basis of the measured driving time.

Third Embodiment

In the second embodiment, a method for determining the expiration of the lives of replaceable items by comparing a printed image stored in the life-expiration determining server 162 with a scanned image has been described. However, to store all printed images in the life-expiration determining server 162, the life-expiration determining server 162 needs a large memory capacity. This embodiment proposes a method for reducing the memory capacity by extracting parameters (features) relating to the image analysis of replaceable items in advance and storing only the parameters (features). In the drawings of this embodiment, the same functions as those in the second embodiment are given the same referenced signs, and descriptions thereof will be omitted.

A flowchart for the operation of the controller 1000 of the copier 150 when the user gives an instruction to print an image is the same as the flowchart in FIG. 9. FIG. 12 is a flowchart for the operation of the life-expiration determining server 162 when the controller 1000 gives an instruction to register the bitmap image with the life-expiration determining server 162 at S210 in FIG. 9. A flowchart for the operation of the controller 1000 of the copier 150 when the user gives an instruction to scan the printed image is the same as the flowchart in FIG. 10. A flowchart for the operation of the life-expiration determining server 162 when the user gives an instruction to scan the printed image is illustrated in FIG. 13.

First, a flowchart for the operation of the life-expiration determining server 162 when instructed to register a printed image will be described with reference to FIG. 12. The life-expiration determining server 162 receives a printed bitmap image and additional print information (S300) and calculates the average darkness of CMYK colors from the bitmap image (S301). The life-expiration determining server 162 then registers the average darkness with the HDD 2520 using the printer serial number 5001 and the page count 5002 in the additional print information as keys (S302).

Next, a flowchart for the operation of the life-expiration determining server 162 when receiving a scanned bitmap image will be described with reference to FIG. 13. The life-expiration determining server 162 receives additional print information and a scanned bitmap image transmitted from the copier 150 (S340). The life-expiration determining server 162 acquires the average darkness printed during printing from the additional print information (S341). The life-expiration determining server 162 calculates the average darkness of the individual colors of the scanned bitmap image (S342). The image-comparing life-determining unit 2532 determines whether the average darkness of the scanned image is lower (lighter) than the average darkness of the printed image by a predetermined threshold value, as the image-comparing life-determining unit 1041 in the first embodiment does (S343). If the average darkness is lower, the life-expiration determining unit 2533 inquires of the copier 150 used for printing to acquire the serial numbers of cartridges 5 mounted at the present (S344). The image-comparing life-determining unit 2532 compares the cartridge serial numbers in the additional print information with the cartridge serial numbers received from the copier 150 to determine whether there is a difference (S345). If the cartridge serial numbers are the same, the cartridges 5 have not been replaced, and the image-comparing life-determining unit 2532 notifies the copier 150 that the cartridges 5 have come to the end of the lives to prompt to replace the cartridges 5 (S346).

According to the embodiment of the present invention, the capacity of data to be stored in the life-expiration determining server 162 can be small, thereby reducing the cost for the life-expiration determining server 162. If the algorithm for determining whether the replaceable items have come to the end of lives can digitize the features of the images and can determine the expiration of the lives of the replaceable items by comparing the values, the embodiment can also be applied to replaceable items other than toner.

While in this embodiment image analysis is performed by the life-expiration determining server 162, the process of calculating the average darkness and the determination of expiration of lives may be performed by the controller 1000 of a copier 150 that has scanned the paper.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032064, filed Feb. 20, 2015, which is hereby incorporated by reference herein in its entirety.

The invention claimed is:

1. An image forming system comprising:
an image forming apparatus; and
an external device communicating with the image forming apparatus,
wherein the image forming apparatus comprises
a member for use in forming an image on a recording material,
wherein the external device comprises:
a storage configured to store first image information on the image formed on a recording material; and
one or more processors configured to
determine a state of the member;
add additional information including identification information to the first image information,
register the identification information and the first image information with the storage unit in association with each other,
extract the additional information from second image information acquired by scanning the image formed on the recording material, acquire information on the image from the storage unit based on the identification information in the extracted additional information, compare the first image information with the second image information, and determine a degraded state of the member based on a comparison result so as to determine a life of the member.

2. The image forming system according to claim 1, wherein the one or more processors of the image forming apparatus arg further configured to measure the usage amount of the member, wherein the added additional information comprises information on the measured usage amount, and wherein if the amount of the member used is larger than or equal to a threshold value, the processor determines a degraded state of the member.

3. The image forming system according to claim 1, wherein the added additional information is based on a two-dimensional code.

4. The image forming system according to claim 1, wherein the additional information is added using an electronic watermark technique.

5. The image forming system according to claim 1, wherein the member comprises toner.

6. The image forming system according to claim 1, wherein the member comprises at least one of a photoconductor on which an image is formed, a fuser configured to fuse the image on the recording material, a conveying roller that conveys the recording material, and an intermediate transfer member on which the image is formed, and wherein the usage amount of the member comprises a time taken to drive the member.

7. The image forming system according to claim 1, wherein the storage stores a feature calculated based on information on the image.

8. The image forming system according to claim 1, wherein the image forming apparatus comprises a scanner, and wherein the scanner scans the image formed on the recording material to acquire the second image information.

9. The image forming system according to claim 1, further comprising:

a scanner communicating with the external device, wherein the scanner scans the image formed on the recording material to acquire the second image information.

* * * * *